(12) United States Patent  (10) Patent No.: US 7,780,858 B2
Miks  (45) Date of Patent: Aug. 24, 2010

(54) METHOD FOR CONTROLLING BACTERIAL GROWTH IN PROCESS WATER

(75) Inventor: Michael William Miks, Littleton, CO (US)

(73) Assignee: Johns Manville, Denver, CO (US)

( * ) Notice: Subject to any disclaimer, the term of this patent is extended or adjusted under 35 U.S.C. 154(b) by 163 days.

(21) Appl. No.: 11/879,171

(22) Filed: Jul. 16, 2007

(65) Prior Publication Data

US 2008/0210641 A1  Sep. 4, 2008

Related U.S. Application Data

(63) Continuation of application No. 10/888,822, filed on Jul. 9, 2004, now Pat. No. 7,258,802.

(51) Int. Cl.
*C02F 1/76* (2006.01)

(52) U.S. Cl. .................. 210/754; 210/764; 210/765

(58) Field of Classification Search .............. 210/754, 210/764, 765; 427/389.8
See application file for complete search history.

(56) References Cited

U.S. PATENT DOCUMENTS

| 3,328,294 | A | * | 6/1967 | Self et al. .................. 210/744 |
| 3,336,185 | A | * | 8/1967 | Helbing .................. 427/389.8 |
| 5,368,749 | A | * | 11/1994 | La Zonby .................. 210/756 |
| 5,395,530 | A | * | 3/1995 | Robertson et al. .......... 210/632 |
| 7,258,802 | B2 | * | 8/2007 | Miks .......................... 210/753 |
| 7,435,444 | B2 | * | 10/2008 | Freeman et al. ................ 427/8 |
| 2002/0091185 | A1 | * | 7/2002 | Taylor et al. ............... 524/249 |

* cited by examiner

*Primary Examiner*—Matthew O Savage
(74) *Attorney, Agent, or Firm*—Robert D. Touslee

(57) ABSTRACT

A system for reducing or preventing the growth of organisms in the process water used to coat glass fibers with a formaldehyde-free binder composition. One or more biocides is added to the process water that mitigates the growth of microbes in the water. The biocides are added in an amount sufficient to minimize growth of organisms without adversely affecting the application of the binder composition to the glass fibers.

6 Claims, 2 Drawing Sheets

METHOD FOR CONTROLLING BACTERIAL GROWTH IN PROCESS WATER

TECHNICAL FIELD

This application is a continuation of application Ser. No. 10/888,822, filed Jul. 9, 2004 now U.S. Pat. No. 7,258,802. The invention relates to a system for controlling the amount of organisms in process water used to form binder coated glass fibers. Reducing or eliminating the organisms present in the process water serves at least three critical functions. First, the organisms in the process water may pose health risks to plant personnel and others who may come into contact with the bacteria. Reducing the level of organisms present reduces these health risks. Second, some organisms may corrode process piping and equipment, requiring costly repairs and replacement, and hampering the ability to efficiently operate the process. Reducing or eliminating the level or organisms minimizes the risk of corrosion of piping and equipment. Third, growth or organisms may cause blockage in process lines, resulting in inefficient operation. Reducing the level of organisms also reduces blockage in process lines.

BACKGROUND OF THE INVENTION

Fiberglass binders have a variety of uses ranging from stiffening applications where the binder is applied to woven or non-woven fiberglass sheet goods and cured, producing a stiffer product; thermo-forming applications wherein the binder resin is applied to sheet or lofty fibrous product following which it is dried and optionally B-staged to form an intermediate but yet curable product; and to fully cured systems such as building insulation.

Fibrous glass insulation products generally comprise matted glass fibers bonded together by a cured thermoset polymeric material. Molten streams of glass are drawn into fibers of random lengths and blown into a forming chamber where they are randomly deposited as a mat onto a traveling conveyor. The fibers, while in transit in the forming chamber and while still hot from the drawing operation, are sprayed with an aqueous binder. A phenol-formaldehyde binder is currently used throughout the fibrous glass insulation industry. The residual heat from the glass fibers and the flow of air through the fibrous mat during the forming operation are generally sufficient to volatilize the majority to all of the water from the binder, thereby leaving the remaining components of the binder on the fibers as a viscous or semi-viscous high solids liquid. The coated fibrous mat is transferred to a curing oven where heated air, for example, is blown through the mat to cure the binder and rigidly bond the glass fibers together.

Fiberglass binders used in the present sense should not be confused with matrix resins which are an entirely different and non-analogous field of art. While sometimes termed "binders," matrix resins act to fill the entire interstitial space between fibers, resulting in a dense, fiber reinforced product where the matrix must translate the fiber strength properties to the composite, whereas "binder resins" as used herein are not space-filling, but rather coat only the fibers, and particularly the junctions of fibers. Fiberglass binders also cannot be equated with paper or wood product "binders" where the adhesive properties are tailored to the chemical nature of the cellulosic substrates. Many such resins, e.g. resorcinol/formaldehyde resins, are not suitable for use as fiberglass binders. One skilled in the art of fiberglass binders would not look to cellulosic binders to solve any of the known problems associated with fiberglass binders.

Binders useful in fiberglass insulation products generally require a low viscosity in the uncured state, yet have characteristics to form a rigid thermoset polymeric mat for the glass fibers when cured. A low binder viscosity in the uncured state is required to allow the mat to be sized correctly. Also, viscous binders tend to be tacky or sticky and hence they lead to accumulation of fiber on the forming chamber walls. This accumulated fiber may later fall onto the mat causing dense areas and product problems.

From among the many thermosetting polymers, numerous candidates for suitable thermosetting fiberglass binder resins exist. However, binder-coated fiberglass products are often of the commodity type. Thus, cost becomes a driving factor, generally ruling out such resins as thermosetting polyurethanes, epoxies, and others. Due to their excellent cost/performance ratio, the resins of choice in the past have been phenol/formaldehyde resins. Phenol/formaldehyde resins can be economically produced, and can be extended with urea prior to use as a binder in many applications. Such urea-extended phenol/formaldehyde binders have been the mainstay of the fiberglass insulation industry for years.

Over the past several decades, however, minimization of volatile organic compound emissions (VOCs) both on the part of the industry desiring to provide a cleaner environment, as well as by Federal regulation, has led to extensive investigations into not only reducing emissions from the current formaldehyde-based binders, but also into candidate replacement binders. For example, subtle changes in the ratios of phenol to formaldehyde in the preparation of the basic phenol/formaldehyde resole resins, changes in catalysts, and addition of different and multiple formaldehyde scavengers, have resulted in considerable improvement in emissions from phenol/formaldehyde binders as compared to the binders previously used. However, with more stringent federal regulations, more attention has been paid to alternative binder systems which are free from formaldehyde.

One particularly useful formaldehyde-free binder system employs a binder comprising a polycarboxy polymer and a polyol. As used herein, formaldehyde-free refers to resins in compositions that are substantially free of formaldehyde and/or do not liberate substantial amounts of formaldehyde as a result of drying or curing. Formaldehyde-free resins do not emit appreciable levels of formaldehyde during the insulation manufacturing process and do not emit formaldehyde under normal service conditions. Use of this binder system in conjunction with a catalyst, such as an alkaline metal salt of a phosphorous-containing organic acid, results in glass fiber products that exhibit excellent recovery and rigidity properties.

An inherent benefit of phenolic-based resins is the natural biocide characteristics of formaldehyde. As used herein, the term "biocide" refers to agents which destroy or kill organisms as well as materially inhibit the growth of organisms. Formaldehyde-free binder systems, such as a system comprising a polycarboxy and a polyol, do not have such a natural biocide characteristic. Thus, use of formaldehyde-free binders results in process water systems becoming overwhelmed with growing organisms. As a result of high levels of harmful organisms in the process water, plant personnel are exposed to a risk of adverse health effects. In addition, some organisms may cause corrosion of process piping and equipment, requiring costly repairs and replacement and hampering the ability to efficiently operate the process. Also, a high level of organisms may cause blockage of process lines. Thus, preventative measures need to be taken to significantly reduce or eliminate entirely the organisms in the process water.

BRIEF SUMMARY OF THE INVENTION

Formaldehyde-free binders used to coat glass fiber products are typically sprayed onto the product in the form of an aqueous slurry. After the product is dried, residual water is collected in a collection box and sent to a process water reservoir, where it remains until recycled back into the process. Harmful organisms may form and grow in the process water reservoir or elsewhere in the process water system, posing health risks to plant personnel, causing corrosion of process piping and equipment and clogging process lines.

Bacteria are among the most harmful organisms that may form in a process. Generally, two types of bacteria form in the process water, aerobic and anaerobic bacteria. Anaerobic bacteria, the more harmful of the two, thrive in anaerobic (little or no oxygen) conditions. They must have anaerobic conditions which may be associated with microsites in an otherwise oxidized system. Among the anaerobic bacteria that often grow in recycle process water are sulfate-reducing bacteria. Sulfate reducing bacteria often find small anaerobic pockets under deposits or in accumulated debris in process waters. They use sulfate as their last electron acceptor and convert it to hydrogen sulfide, a material notorious for its corrosivity to virtually all metals. The production of hydrogen sulfide and resulting corrosion is particularly harmful to process piping and equipment.

"Aerobic bacteria" may also form in the process water container. Aerobic bacteria can survive in the presence of oxygen. While not as harmful as anaerobic bacteria, aerobic bacteria may nonetheless cause health problems for those plant personnel that come into contact with it, as well as cause some corrosion and blockage of process piping and equipment.

While bacteria are among the most common and most harmful organisms that form in process water, other organisms may also form and cause various problems.

Adding an effective amount of one or more biocides to the process water controls the growth of organisms in process water used to form binder coated fibers without interfering with the binder composition or corroding process piping. The present invention provides a means for controlling the growth of organisms in process water used to form binder coated fibers. The invention is a method for controlling the growth of organisms in the process water by adding a biocide to the process water. Alternatively, radiation can be used to prevent or control the growth of organisms.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
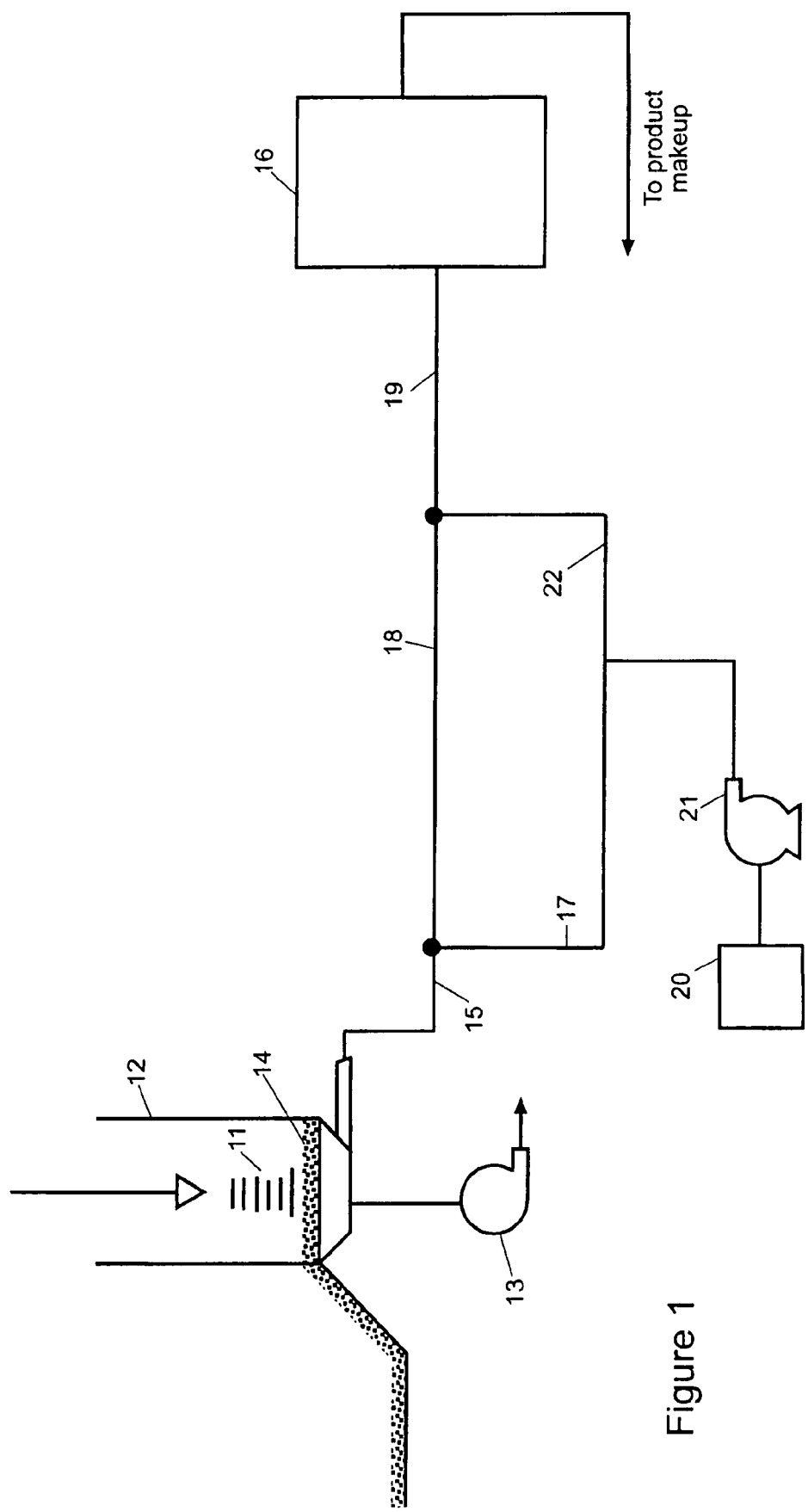
FIG. 1 is a schematic of the process, showing the addition of one biocide to a recycle water slip stream.

The invention relates to a method for reducing or eliminating organisms in the system used to recycle process water employed in the production of glass fiber product. The method is particularly useful for systems that produce formaldehyde-free binders containing fiberglass products.

Among the formaldehyde-free binders described above are typically polycarboxy polymers such as acrylic resins, although any formaldehyde-free resin or binder compositions are within the scope of this invention. Formaldehyde-free resins generally have a molecular weight of less than about 10,000, preferably less than about 5,000, most preferably less than about 3,000 with about 2,000 being advantageous.

The polycarboxy polymer used in the binder of the present invention comprises an organic polymer or oligomer containing more than one pendant carboxy group. The polycarboxy polymer may be a homopolymer or copolymer prepared from unsaturated carboxylic acids including, but not necessarily limited to, acrylic acid, methacrylic acid, crotonic acid, isocrotonic acid, maleic acid, cinnamic acid, 2-methylmaleic acid, itaconic acid, 2-methylitaeonic acid, alpha., .beta.-methyleneglutaric acid, and the like. Alternatively, the polycarboxy polymer may be prepared from unsaturated anhydrides including, but not necessarily limited to, maleic anhydride, methacrylic anhydride, and the like, as well as mixtures thereof. Methods for polymerizing these acids and anhydrides are well known in the chemical art.

The formaldehyde-free curable aqueous binder composition of the present invention also contains a polyol containing at least two hydroxyl groups. The polyol must be sufficiently nonvolatile such that it will remain substantially available for reaction with the polyacid in the composition during heating and curing operations. The polyol may be a compound with a molecular weight less than about 1,000 and having at least two hydroxyl groups such as, for example, ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, and certain reactive polyols such as, for example, beta.-hydroxyalkylamides such as, for example, bis[N,N-di(∃-hydroxyethyl)]adipamide, as may be prepared according to the teachings of U.S. Pat. No. 4,076,917, hereby incorporated herein by reference, or it may be an additional polymer containing at least two hydroxyl groups such as, for example, polyvinyl alcohol, partially hydrolyzed polyvinyl acetate, and homopolymers or copolymers of hydroxyethyl(meth)acrylate, hydroxypropyl(meth)acrylate, and the like. The most preferred polyol for the purposes of the present invention is triethanolamine. (TEA)

The ratio of the number of equivalents of carboxy, anhydride, or salts thereof of the polyacid to the number of equivalents of hydroxyl in the polyol is from about 1/0.01 to about 1/3. An excess of equivalents of carboxy, anhydride, or salts thereof of the polyacid to the equivalents of hydroxyl in the polyol is preferred. The more preferred ratio of the number of equivalents of carboxy, anhydride, or salts thereof to the number of equivalents of hydroxyl in the polyol is from about 1/0.4 to about 1/1. The most preferred ratio of the number of equivalents of carboxy, anhydride, or salts thereof in the polyacid to the number of equivalents of hydroxyl in the polyol is from about 1/0.6 to about 1/0.8, and most preferably from 1/0.65 to 1/0.75. A low ratio, approaching 0.7/1, has been found to be of particular advantage in the present invention, when combined with a low molecular weight polycarboxy polymer and the low pH binder.

The formaldehyde-free curable aqueous binder composition of the present invention also contains a catalyst. Most preferably, the catalyst is a phosphorous-containing accelerator which may be a compound with a molecular weight less than about 1,000 such as, for example, an alkali metal polyphosphate, an alkali metal dihydrogen phosphate, a polyphosphoric acid, and an alkyl phosphinic acid or it may be an oligomer or polymer bearing phosphorous-containing groups such as, for example, addition polymers of acrylic and/or maleic acids formed in the presence of sodium hypophosphite, addition polymers prepared from ethylenically unsaturated monomers in the presence of phosphorous salt chain transfer agents or terminators, and addition polymers containing acid-functional monomer residues such as, for example, copolymerized phosphoethyl methacrylate, and like phosphonic acid esters, and copolymerized vinyl sulfonic acid monomers, and their salts. The phosphorous-containing accelerator may be used at a level of from about 1% to about 40%, by weight based on the combined weight of the polyacid and the polyol. Preferred is a level of phosphorous-containing accelerator of from about 2.5% to about 10%, by weight based on the combined weight of the polyacid and the polyol.

The binder resins used in the invention are usually supplied as an aqueous suspension containing about 48 to 53 Wt. % solids. The binder composition used in the invention is prepared by first further diluting the binder to create an aqueous binder composition.

Acid is then added to the aqueous binder composition to reduce the pH to less than about 3.5, preferably less than 3.0, more preferably less than 2.5. Low pH has been found to be important in ensuring proper application and curing of the binder composition.

The binder is then applied to the fiberglass in a manner well known to those skilled in the art. After the binder is applied, much of the water in the binder, also known as the process water, is removed and captured for reuse by means of a recycle system. In addition, the water used to wash residual binder from the production equipment is also added to the recycle system.

Harmful organisms can grow and live in the process water contained in the recycle system. This is especially true if the recycled process water is stored for some period of time before reuse. This can cause health problems for plant personnel and others who come into contact with the organisms. For example, legionella can grow in the storage tanks. Further, some types of organisms, particularly anaerobic sulfate-reducing bacteria, may cause corrosion of process piping and equipment. Preventative measures need to be taken to control or eliminate the growth of organisms in the process water.

The addition of an effective amount of a suitable biocide may reduce, kill or suppress the growth of harmful organisms in the process water system. Biocides useful in the practice of the invention include oxidants such as ozone, hydrogen peroxide, halogens (e.g. chlorine, bromine and iodine) and halogen-containing compounds. The halogen-containing compounds useful in the practice of the invention include sodium bromide, sodium hypochlorite, calcium hypochlorite, and iodine-containing compounds, with sodium bromide and sodium hypochlorite preferred. Penetrants can be used to improve the efficacy of some biocides such as glutaraldehyde, methylene bis thicyanate. Finally, other effective biocides will be readily apparent to those skilled in the art.

In addition to the use of chemical biocides, other methods can be used to treat the process water. For example, the process water can be exposed to radiation at sufficient intensity to kill organisms present in the water. Of the numerous radioactive treatments known to those skilled in the art, ultraviolet radiation is preferred.

The amounts and types of organisms that grow in the process water in turn depend on a variety of factors. The amount of biocide that must be added to be effective in practicing the invention depends on the amounts and types of organisms that grow in the process water, and the volume of the system being treated. For example, the type of binder used in the process and the amount of time the water is stored before being reused affect the amounts and types of organisms that form. Other factors that contribute to organisms forming in the process will be apparent to those skilled in the art.

In one embodiment using a liquid biocide, treatment rates may range from about a 1.6-gallon (6.05-liter) dose of biocide added once per day to about a 12-gallon (45.4-liter) dose of biocide added three times per week. More frequent treatment may also be employed where feasible; for example, a 1.8-gallon (6.8-liter) dose of biocide added about twenty-one times per week may be used. When treating the process with a solid form of biocide, a typical treatment amount is a continuous treatment of about 50 pounds (22.7 kilograms) per day. Although these amounts are typical, the amount required may vary significantly depending on several process characteristics. Necessary treatment amounts will be readily apparent to those skilled in the art.

A biocide may be introduced into the process in several ways. A preferred method is to pump or otherwise inject a biocide in liquid form into a slip stream taken off the main process water recycle stream. The slip stream is then sent back into the main recycle stream before being sent to a process water reservoir. A metering pump may be used to automatically control the amount of biocide injected into the slip stream depending on system needs.

Alternatively, a powder form of the biocide may be introduced anywhere in the recycle water system using any suitable means. Also, solid tablets may be dropped directly into the process water reservoir. If feasible, a biocide may even be bubbled into the recycle process water in gaseous form. Finally, in the case of radiation, the process water stream may be exposed to a focused beam of radiation for a sufficient period to ensure eradication of any organisms present. Other methods of introducing a biocide, well known to those skilled in the art, may be employed as well.

More than one biocide may be added to the process water, either by taking a slip stream off of the main recycle stream or by adding the biocides directly to the main recycle stream. One preferred method adds a liquid form of one biocide to a recycle slip stream, then adds another biocide to the recycle slip stream before combining the slip stream with the main recycle stream. However, any number of biocides may be added by any of the methods described above, or by any other suitable method.

As discussed above, the production of formaldehyde-free fiberglass products requires the use of sufficient amounts of process water. The water is extracted from the product just before the product is cured. This extracted process water is then recycled back into the process through the recycle system.

One embodiment of the invention is shown in FIG. 1. The binder coated fibers 11 are gathered in a collection box 12. Air is drawn through the collection box by one or more fans 13 which gather the glass fibers into a mat 14. The air flow also forces residual water out of the fiberglass mat 14, drying the collected fibers before they leave the collection box 12. A recycle stream 15 containing the process water is then sent to a process water reservoir 16, where it is stored until being recycled back into the process. Harmful bacteria may form in the process water reservoir 16 and elsewhere in the recycle system, raising health concerns for plant personnel and possibly corroding process piping and equipment when the water is recycled back into product makeup part of the process. As a result, a slip stream 17 is taken off of the recycle stream 15 and treated with one or more biocides. It is then sent back into the main recycle stream 18 and the combined stream 19 is sent to the process water reservoir 16.

The biocide or combination of biocides used to treat the process water system should be effective against both anaerobic and aerobic bacteria, and particularly against harmful sulfate-reducing bacteria. A commonly used biocide is sodium bromide. Sodium bromide effectively kills both types of bacteria. Thus, it is a commonly used biocide for this type of water treatment. As shown in FIG. 1, sodium bromide, for example, is stored in a storage vessel 20 and is injected into the recycle slip stream 17 periodically. A metering pump 21 may be utilized to effectively control the amount of sodium bromide added to the recycle system. The combined stream 22 is then rejoined with the main recycle stream 18, and the resulting stream 19 is sent to the process water reservoir 16.

An example of an effective sodium bromide treatment system is LiquiBrom 4000, by Houghton Chemical Corporation. LiquiBrom 4000 is a ready-to-use solution of sodium bromide. It provides a cost-effective way to treat industrial process waters using bromine chemistry. In practice, a wide range of factors can effect the required treatment, including condition of the recycle water, system halogen demand, treatment objectives, sensitive equipment locations, and sample point locations.

Figure 2:
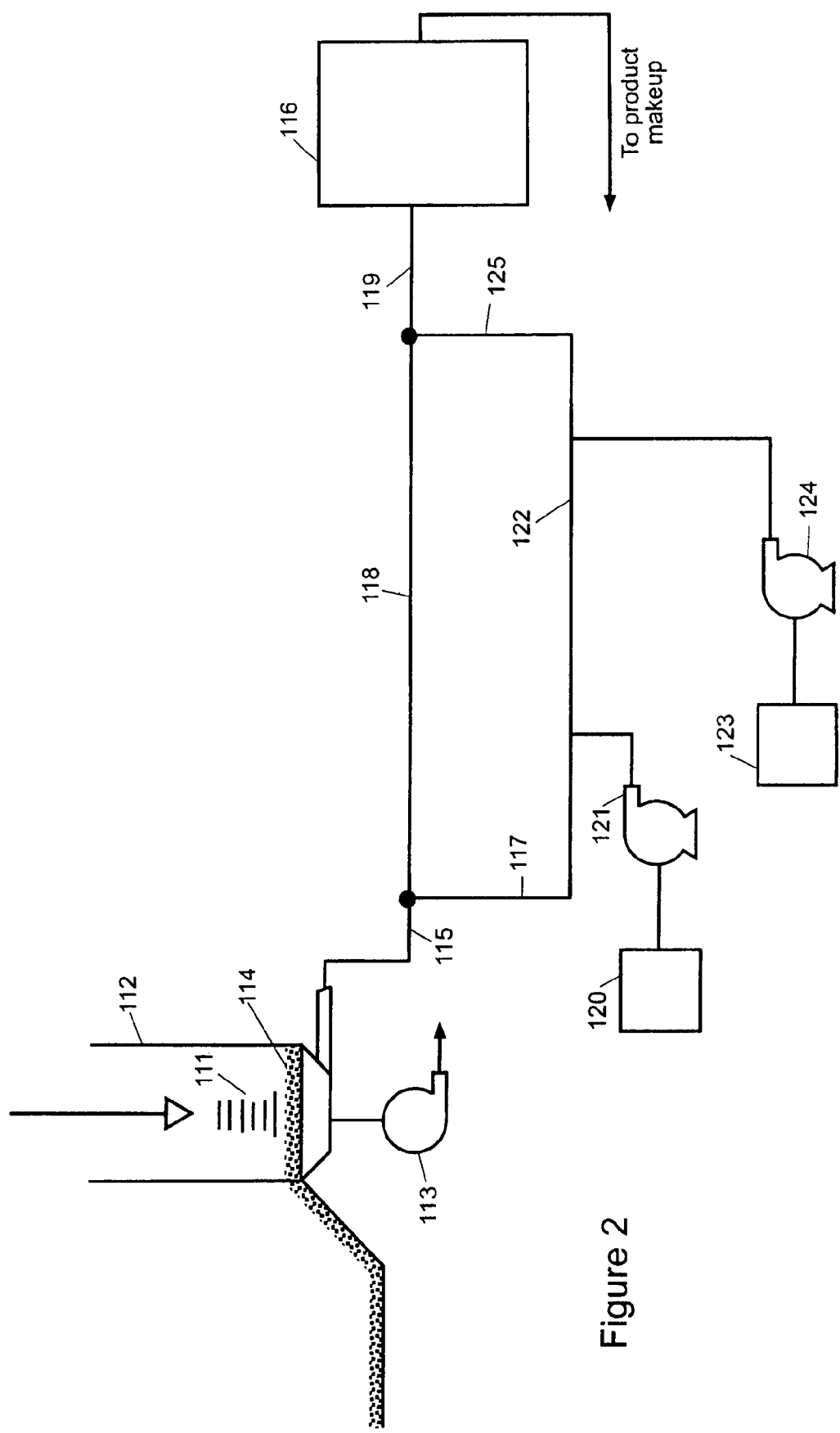
FIG. 2 is a schematic of the process, showing the sequential addition of two biocides to a recycle water slip stream.

Sodium bromide is most effective when mixed in water and activated by a chlorine source (such as chlorine or sodium hypochlorite). As shown in FIG. 2, sodium bromide is stored in a storage vessel 120, and injected into a recycle water slip stream 117. A metering pump 121 may be used to monitor and control the amount of sodium bromide added to the slip stream 117. A chlorine compound such as sodium hypochlorite is then added to the resulting stream 122. Again, the chlorine compound is stored in a storage vessel 123, and a metering pump 124 may be utilized to control the amount of the chlorinated compound added to the process. The combined stream 125 of sodium bromide, the chlorinated compound and recycle water is then directed back into the main recycle stream 118, and sent to a recycle water reservoir 116. The numbers for each process stream or piece of equipment in FIG. 2 corresponds to the same stream or piece of equipment in FIG. 1, except that in FIG. 2 a "1" has been added. For example, the recycle slip stream is numbered 17 in FIG. 1. The same stream is numbered 117 in FIG. 2.

Sodium bromide is just one example of a suitable biocide for treating the process water. Any effective biocide may be used. An effective biocide should kill or inhibit the growth of harmful aerobic and anaerobic bacteria. Further, it should not alter the composition of the binder, corrode process piping or equipment, or cause blockage in the process piping.

In addition to sodium bromide and other biocides, addition of one or more penetrants serves to such as gluteraldehyde, carbamates, and thiocyanates may improve the effectiveness of biocides. However, any substance that effectively reduces nutrients available to organisms in the process water without otherwise harming or hampering the process may be used.

Additionally, it is not necessary that any or all biocides be introduced into the recycle water system in liquid form as shown in FIGS. 1 and 2. Solid biocide may also be introduced in powder or pellet form, if available. Solid biocide tablets may also be dropped directly into the process water reservoir for effective treatment. In addition, a biocide gas may be bubbled into the system to effectively reduce or eliminate the harmful bacteria and other organisms. The efficiency of one form relative to the others will depend largely on the amount and type of bacteria or organisms in the recycle water system, and the resulting treatment requirements. It is generally thought that addition of biocide in liquid form is most efficient in most situations.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for controlling bacterial growth in process water stream used to form acrylic coated fibers comprising adding an effective amount of at least one biocide to the process water stream
    wherein the effective amount of at least one biocide is added to a slip stream taken off of the process water stream.

2. The method of claim 1 in which any biocides added to the process water are oxidants.

3. The method of claim 2 in which at least one biocide added to the process is a halogen-containing compound.

4. The method of claim 2 in which a biocide is sodium bromide.

5. The method of claim 1 in which the biocide or biocides are added in liquid form.

6. The method of claim 5 in which the biocide or biocides are added at a rate between about 40 and 130 liters per week.

* * * * *